US008197183B2

(12) United States Patent
Ward et al.

(10) Patent No.: US 8,197,183 B2

(45) Date of Patent: Jun. 12, 2012

(54) SPHERICAL THRUST BEARING SYSTEM FOR TURBOCHARGERS

(75) Inventors: Daniel Ward, Asheville, NC (US); Allan Kelly, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 532 days.

(21) Appl. No.: 12/495,898

(22) Filed: Jul. 1, 2009

(65) Prior Publication Data

US 2010/0008767 A1 Jan. 14, 2010

Related U.S. Application Data

(60) Provisional application No. 61/079,588, filed on Jul. 10, 2008.

(51) Int. Cl.
*F01D 25/16* (2006.01)

(52) U.S. Cl. .................... 415/107; 415/111; 415/170.1; 415/229; 416/174

(58) Field of Classification Search .................. 415/107, 415/111, 170.1, 229; 416/174
See application file for complete search history.

(56) References Cited

U.S. PATENT DOCUMENTS

| | | | | |
|---|---|---|---|---|
| 3,043,636 | A * | 7/1962 | MacInnes et al. | 384/287 |
| 3,827,770 | A * | 8/1974 | Horler | 384/107 |
| 4,157,881 | A * | 6/1979 | Kasuya | 415/175 |
| 4,460,284 | A * | 7/1984 | Lauterbach et al. | 415/111 |
| 7,008,194 | B2 * | 3/2006 | Frankenstein | 415/175 |
| 7,086,842 | B2 * | 8/2006 | Wild | 416/174 |

* cited by examiner

*Primary Examiner* — Igor Kershteyn

(74) *Attorney, Agent, or Firm* — William G. Anderson; Stephen A. Pendorf; Patent Central LLC

(57) ABSTRACT

A turbocharger thrust bearing assembly, which maintains a constant relationship between the thrust faces, for example by use of gimbal or spherical segment geometry. Spherical geometry, while more difficult to manufacture than that of a flat thrust bearing, provides a more constant relationship between the thrust pads and thrust washers than is possible with a typical flat thrust bearing. As a consequence of this more constant relationship the thrust bearing operates with less oil flow, which ultimately may reduce vehicle emissions.

9 Claims, 18 Drawing Sheets

SPHERICAL THRUST BEARING SYSTEM FOR TURBOCHARGERS

FIELD OF THE INVENTION

This invention deals with the design of thrust bearings in turbochargers.

DESCRIPTION OF THE RELATED ART

Turbochargers are used on engines to increase the mass flow of intake air going into the combustion chamber. When this increase in mass flow is matched with an appropriate increase in fuel flow, a large increase in engine power output is achieved. Energy is extracted from the engine exhaust to drive a turbine wheel, which is mechanically connected to a compressor wheel. The work done by the rotation of the compressor wheel, in it's housing, translates the energy from the turbine to total pressure and temperature.

Turbochargers operate at very high rotational speed. Rotational speed is measured at the outer tip of the compressor wheel blade leading edge, and is thus a function of both rpm and diameter. The maximum operating rotational speed for each compressor wheel is chosen by the individual manufacturers for a variety of aerodynamic and structural reasons. For large turbochargers this tip speed translates to around 80,000 RPM. For small turbochargers this tip speed translates to 300,000 RPM.

Because of these extremely high speeds the design of the bearings is both difficult and critical.

There are two modes for bearing function—radial and axial. The radial loads are controlled by the journal bearings (120), and the axial loads by the axial or thrust bearing (114) as seen in FIG. 1.

The journal bearings for very large turbomachinery, or for early turbochargers, were of the fixed sleeve type in which the shaft rotates within the bearing, supported on an oil film, but the bearings in this design do not rotate with respect to the bearing housing. As speeds increased this type of bearing was not sufficient to control the shaft motion and was replaced by floating type bearings in which there is an outer film in addition to the inner film supporting the shaft. In the case of floating bearings the shaft freely rotates within the bearing and the bearing freely rotates within the bearing housing.

Oil pressure from the engine is delivered to the turbocharger bearing housing. It is then distributed to the journal bearings by drillings in the bearing housing and through the bearing bore to the bearings. The bearings themselves usually have radial holes joining the inner and outer diameters so the oil, under pressure, is delivered to the inner surface of the bearing. The action of the shaft rotation relative to the inner bearing surface generates a multi-lobed oil wedge, which supports the shaft inside the bearing. The surface tension in the oil assists the wedge in driving the bearing, relative to the shaft. It is normal to see the bearing rotating at approximately 33%.N, where N is the shaft speed. The centrifugal motion between shaft and inner bearing also causes some of the oil to be pumped to the outer oil film area. The volume between the outer bearing diameter and the bearing housing.

As in the case with the dynamics between shaft and inner bearing, the relative motion of the outer diameter of the bearing, which is rotating, and the bearing housing, which is static, produces a like multi-lobed oil wedge which then supports the bearing inside the bearing housing.

Not all bearings use radial holes for the oil transport. Some have grooves, both radial and axial, in ether inner or outer diameter surfaces. The function is the same; support the shaft while providing damping.

If the bearing system does not sufficiently control the shaft, then the shaft will go out of control and allow contact between either wheel (turbine or compressor) with its housing, which ultimately results in destruction of the turbocharger.

The rotor dynamics of a turbocharger are quite complex.

The dynamic loads on the rotating assembly come from a variety of sources:

- rotating assembly unbalance;
- rotating assembly modal excursions;
- excitation of the turbocharger pedestal from the engine, exhaust manifold, combustion events, etc.; and
- excitation of the pedestal from vehicle events.

The rotating assembly shown as FIG. 2, consists of: the shaft and turbine wheel (101), (110), the compressor wheel (111), the collection of small parts including thrust washers (102) and (105) (these can be made as a single part, or an assembly of separate parts), the oil flinger, which is usually a feature in the thrust washer component, nut (112), etc. which are fixed to the shaft and wheel at assembly so the assembly acts as a single component. The rotating assembly must be balanced to a very high degree. The individual components are balanced so that at high speed they are within balance limits. This assembly is also balanced, as an assembly, at low or high speed, depending on the application, for a variety of reasons.

The rotating assembly goes through 3 critical speed modes. The conical mode, the cylindrical mode and the bending critical mode. These modes are theoretically analyzed and designed such that the critical speeds are such that the turbo does not enter that speed range.

These types of bearings allow the shaft to rotate under control. The shaft does not describe a circle, but a series of orbits. As the shaft speed increases, the end of the shaft at the compressor-end describes small loops (31) and, as shown in FIG. 3*a*, these loops themselves describe a larger orbital trace (32). Once the speed has stabilized the orbits repeat, within reason. FIG. 3*b* shows repeated orbits (30) described by the compressor-end of the shaft. The point representing the true geometric center of the bearing housing (33) is not necessarily the center of the orbits (30). The lines of the repeated orbits (30) are the result of many runs overlaid, if only a few rotations were shown the motion would be similar to that of the initial runs with the loops missing.

FIG. 4 shows the orbits described by the end of the turbine wheel on the shaft centerline. The coordinate center of the graph (40) in FIG. 4 represents the true geometric center of the bearing housing. The spiral represents the orbits (41) described by the shaft at speeds growing to maximum speed. The outer circle (42) represents the motion of the shaft at high speed. The outer circle (42) is the result of many runs overlaid.

FIG. 5 shows the collective display of shaft motion at various points along the shaft. Starting from the left end:

- the first orbit (50) is that of the compressor nut,
- the second orbit is the compressor nose,
- the third orbit is the compressor mass center,
- the fourth orbit is the compressor backface unbalance,
- the fifth orbit (51) is the thrust washer,
- the $6^{th}$ orbit (52) is the compressor-end journal bearing,
- the $7^{th}$ orbit (53) is the bearing mid-span,
- the $8^{th}$ orbit (54) is the turbine-end journal bearing,
- the $9^{th}$ orbit is the turbine wheel back wall unbalance,
- the $10^{th}$ orbit is the turbine mass center, the 11$^{th}$ orbit is the turbine wheel nose unbalance, and
the 12$^{th}$ orbit (55) is the turbine wheel nose.

It can been seen from this analysis that there is very little radial displacement of points along the shaft between the axial positions of the journal bearings (52 to 54).

The thrust bearing is required to withstand the net aerodynamic and dynamic axial loadings on the rotating assembly. FIG. 6 schematically represents a turbocharger with a compressor wheel (111) and a turbine wheel (110). The aerodynamic forces acting on the compressor wheel as it sucks air into the turbocharger are the local net force acting on the back side of the compressor wheel (62). Pressures acting on this region are the aerodynamic effect, caused by the rotation of the wheel on the air behind the wheel, and the effect of internal bearing housing pressures as they pass through the seal on the shaft into the volume behind the wheel. This pressure can be grossly influenced, to the positive side (compressor-end), if the compressor wheel is recessed into the bearing housing side of the diffuser face. On the front side of the wheel, the driving of the wheel, by the turbine, sucks air into the wheel and compresses that air, before discharging it into the compressor discharge. This results in a net (usually negative) pressure on the inlet side of the compressor wheel (61). The exhaust pressure (64) acts on the turbine wheel as it drives the wheel. The size of the turbine housing also affects these pressures to the extent that the net thrust loads can be always in one direction. The pressure on the back of the turbine wheel (63) is a local aerodynamic pressure influenced by the bearing housing pressures as they leak through the seal.

The forces acting above are depicted as very much simplified conditions, but always exist. Overlaid on these forces are situations external to the turbocharger. The influence of the air filter is a strong driver of pressures influencing the compressor inlet. As the filter does its job it becomes blocked providing a restriction to the action of the compressor which drives the pressure in the compressor inlet down. The influence of an air conditioner air feed (of filtered air) or of a pump drawing (filtered) air from in front of the compressor inlet also cause an effect on the pressure on the intake side of the compressor wheel. On the turbine side, exhaust brakes can grossly affect the pressure on the blade side of the turbine wheel. The pressure conditions within the bearing housing are influenced by multiple, somewhat removed conditions. Engine compression seeps by the piston rings into the crankcase; when the crankcase vents to the atmosphere, altitude pressures influence the crankcase. Since the bearing housing drain is connected directly to the crankcase to channel the spent oil from the turbocharger back into the engine oil system, the gases in the crankcase can aspirate into the bearing housing, through the oil seals, to influence the pressures behind both of the turbine and compressor wheels.

A VTG, which changes the flow of the exhaust gas to the turbine wheel, causes the thrust bearing loads to go up, or down, depending upon the vane position. The chart in FIG. 7 shows the thrust loads for changes in vane position, indicated on the X-axis (71). To the right of the X-axis, the vanes are fully open, to the left of the X-axis, the vanes are fully closed. Compressor flow is depicted on the chart as the diamond line being on the surge side of the map (77), and the cube line being on the choke side of the map (76). The Y-axis (72) depicts the thrust loads in Newtons, the zero or null line being at (73). This line can change for different configuration of turbo or envelope conditions. The top of the Y-axis (74) is the force towards the turbine-end. The bottom side of the Y-axis (75) is force towards the compressor end. It can be seen that in this case, the null line (73) is not in the center of the Y-axis. For a test turbo it can be seen that the thrust loads, when the vanes are fully open, on the surge side of the map, are towards the compressor end (with a value of −100N), and for the same turbo, at the surge side of the map, the loads are in the same direction but at a greater force (with an value of −240N). At the choke side of the map the changes are different in magnitude and direction. With the vanes fully open, the forces are towards the turbine-end (with a value of +45N). When the vanes are closed the forces are towards the compressor-end (with a value of −150N). When the vanes are at 65% fully open, the forces, on the choke side of the map, are actually at zero, but the forces on the surge side of the map never change direction, always being towards the compressor end. So it can be seen that these thrust forces, for a VTG turbo, are exacerbated by the change in vane position, requiring a more robust thrust bearing in many cases to carry the thrust loads.

The design of a typical thrust bearing is that of a planar or flat sectioned plate FIG. 1 (114), which is mounted in the bearing housing (100). The rotating assembly has a thrust component in it, usually a pair of flat rings FIG. 2 (102), (105) with one positioned on each side of the trust bearing, which apply the net thrust load to the thrust bearing. Quite often the thrust ring (102) on the compressor side is part of the flinger (113), or the component which carries the compressor-end piston ring. These thrust rings typically are one piece, two piece, or three piece, usually depending on manufacturer's preference, but once assembled they function the same way. Thrust loads are transmitted to the thrust bearing through a hydrodynamic oil film and the thrust bearing reacts against the bearing housing, thus causing the shaft to be held in position.

Some thrust bearings have a circular bore in them, for the shaft. Some thrust bearings FIG. 12 have an open segment (137) to aid in assembly. Neither the load carrying capacities, nor the number of pads, are dependent on this aspect of the design. A typical turbocharger thrust bearing, as shown in FIG. 12 has multiple thrust zones (consisting of ramps and pads as seen in FIG. 13) about the axis of the turbocharger. Oil is fed to the thrust pads by a series of oil galleries in the bearing housing and the thrust bearing. A common method for the distribution of oil to separately fed pads is for an oil gallery in the bearing housing to fluidly connect with an oil canal (125) fabricated in the thrust bearing face, adjacent to the bearing housing mounting face. The bearing housing mounting face not only axially locates the thrust bearing in the bearing housing, but also provides closure to the oil canal (125).

The thrust or reaction area of the thrust bearing usually consists of a pair of ground steel washer-like rings, which transmit the thrust loads towards the compressor end, or the turbine end of the rotating assembly. FIG. 10 depicts a typical shaft and wheel (101) with a thrust washers attached. The thrust washer (102) on the left, or compressor-end, transmits thrust towards the turbine-end. The thrust washer (105) on the right side, or turbine-end, transmits thrust towards the compressor-end. The reaction from the thrust bearing (104) to the bearing housing (100) is carried through the interface of thrust bearing (114) and bearing housing (100) in one direction, the thrust bearing (104) and the insert, which is the closure to the bearing housing pocket, in the other direction. On the thrust bearing face, adjacent to the zone of the thrust rings (102) and (105) are thrust pads. FIG. 12 schematically depicts a typical 6 pad thrust bearing (104) with one pad circled. This area is blown up in FIG. 13 to show more clearly the thrust bearing (104), the thrust ring (102), and the ramp (134) for the thrust area (135). The oil feed hole (136) is shown connecting to the canal (125).

The thrust rings are rotating at the speed of the shaft. The thrust bearing is static, as it is fixed, both axially, and radially to the bearing housing, usually with a fastener or pin to prevent rotation. Oil is fed to the bearing housing from the same supply as that which feeds the journal bearings. Engine oil pressure forces the flow of oil into the bearing housing, through the oil inlet (116), via an oil gallery (117) to the oil canal (125) in the thrust bearing. Oil emerges on the thrust bearing ramp (134). The rotation of the thrust washer against the oil film on the ramp of the thrust bearing builds a hydrodynamic oil wedge which, against the thrust bearing pad (135), supports the thrust washers (102) and (105) and thus the thrust load. Since there are two opposing thrust rings and sides of the thrust bearing, thrust loads in either direction are handled by this design. There are many variations on this basic design which all function in the same manner.

The integrity of the oil wedge is dependent upon the relationship between the pad of the thrust bearing and the velocity and geometry of the rotating thrust washer face, as well as a constant flow of oil. The thrust load, which can be supported by such an oil wedge is linearly proportional to speed and viscosity but is inversely proportional to the gap squared, the gap being the distance between the pad and the thrust washer at any point. In the case of a shaft, which as discussed above describes an orbiting pattern at one end and the reciprocal orbiting pattern at the other end, when viewed from the perspective of FIG. 1, tilts, so does the thrust washer, which is hard mounted on the shaft. Accordingly, the thrust washer's gap to the thrust bearing pad also changes drastically, the further the distance from the shaft centerline, since the thrust washer is perpendicular to the shaft.

Typical thrust bearings flow more oil through them than that which flows through the journal bearings. As a consequence the thrust bearing oil flow tends to be a variable, which contributes to the bearing housing filling with oil and that oil passing through either the compressor end seal, or the turbine end seal. If this oil passes through the compressor end, it becomes part of the combustion process and its combustion by-product becomes particulate matter in the emissions of the engine. If the oil passes through the turbine-end seal, then it goes into the exhaust and can poison the catalyst and damage the after-treatment system. As emissions regulations become tighter this aspect of contribution to total emissions becomes more critical.

The manufacture of the thrust bearings may be machining from solid bar, milling from a casting, powdered metal sintering, stampings, and forgings. One consistent feature is that they are all basically flat. The design of the thrust faces and ramps take many forms. The ratios of ramp-to-pad range from 20% ramp to 60% ramp. Some ramps are formed by a coining operation; some ramps are formed by stamping operations, some ramps are formed by machining operations. Some ramps are not fed by oil drillings but by flooding the thrust bearing intake area. What is true of all of these variations is that loss of oil film results in almost immediate thrust bearing failure.

The oil film can be degraded or destroyed by loss of oil pressure or flow. Dirty or contaminated oil (for example contaminated with particulate matter from normal engine combustion) causes the bearing to wear prematurely resulting in loss of pad features and ultimate failure. Overloading the bearing's thrust capacity is another route to failure. This can be caused by mostly external influences such as exhaust brakes or blocked inlet filters.

The design of the ramp-and-pad thrust feature requires that the excursions of the shaft motion be kept to a minimum. The hydrodynamic oil film pressure loading on a perfectly aligned thrust washer and bearing combination is shown in FIG. 8. In this example, the analysis is of a six-pad bearing and it can be seen that the pressure on each pad (80) is well formed on all the pads and is roughly the same. When the thrust washer is presented, to the thrust bearing pad, in a tilted condition, in this case 0.24 degrees, which is a 25% maximum tilt condition (25% of the geometric maximum tilt angle) the oil film thickness is reduced by 94%. In this case only one pad (92), is reaching the desired pressure. One pad (91) is reasonably close to maximum. The pads which have the maximum gap (ie those closest to the shaft) (93) do not show much hydrodynamic oil film pressure so that it can be assumed that the capability of the total thrust bearing system is in the region of 16% to 33% of its potential and this will most likely result in failure. It has been shown, both analytically, and empirically, when a tilt condition exists, that the oil flow to the thrust bearing increases, which produces no benefit for turbo operation, but which may hurt emissions, due to oil passage.

This tilt angle is shown in FIG. 10. The tilt of the shaft (106, 107) being determined by the maximum geometric angle, in both directions, the shaft can attain by producing simulated metal to metal contact between bearing bore (in the bearing housing), the journal bearing, and the shaft at the worst case tolerances for each part in the study. The tilt center (118) is the point at which the (tilted) centerlines of the shaft cross in a simulated shaft tilt study. The two calculated tilt axes (106, 107) cross the geometric locus of the bearing housing bore at the tilt center (118)

The problem of misalignment of pad and thrust face is often solved by spring loaded or tilting pad bearings. U.S. Pat. No. 4,300,808 (Yoshioka) teaches a tilting pad bearing comprising a plurality of bearing pads tiltably disposed in surface contact at their arculate outer peripheral surfaces with an inner surface of the bearing support, pad positioning members for positioning circumferential ends of adjacent bearing pads. As the patent notes most tilting pad bearings have increased part numbers and construction is complicated. At best, tilting pad bearings, while providing acceptable thrust power are too complicated and expensive to produce for turbochargers.

There are also large tilting pad thrust bearings, used for example on ships (for example, Kingbury Pivot-Shoe Thrust Bearings); or see U.S. Pat. No. 6,499,883, (Miller) and U.S. Pat. No. 5,743,654 (Ide) which perform the same task as that of a thrust bearing in a turbocharger, i.e., support thrust loads from a shaft, which presents a thrust face at a varying angle to that of the bearing. The function of these designs is to maintain the angle of attack and the gap distance between thrust bearing pads and their mating thrust faces. These are not easily adapted to a turbocharger due to size and cost constraints.

There are patents, for example U.S. Pat. No. 6,669,372 (Martin), which teach effective methods for supplying sufficient oil to the thrust face by the use of oil channels formed in the mating surfaces of the two elements, which form the surfaces of the bearing. This invention is a cost effective solution for providing sufficient lubrication to the bearing pads to support the thrust loads. This solution solves the tilted thrust problem, which is a changing gap between the thrust bearing pads and their mating thrust faces by flooding the bearing with oil using wells within the thrust surfaces.

U.S. Pat. No. 6,418,722 (Arnold), teaches that locating the thrust collar centrally mounted on the rotating shaft interconnecting the turbine and compressor wheel and a thrust bearing centrally located within the center housing to constrain the thrust collar enhances the shaft motion and sealing capacity. It deals with typical flat thrust bearings, and does not discuss or teach the improvements on said flat thrust bearings by the use of a spherical segment design.

In the emissions environment of the future, the passage of oil from the bearing housing to the compressor or turbine air passages will have to be drastically reduced and this will require a more critical use of lubricant quantity. The problem of today's thrust bearings is that they are not very tolerant of tilt in the shaft, which is caused by the use of cost effective journal bearing designs. Tilt in the shaft can be best technically addressed by the use of costly rolling element bearings, but the life of these bearings is suspect, in the context of components required to last 1 million miles. Of course when rolling element bearings are used they fulfill the thrust function by virtue of their design.

Today's thrust bearings require that they flow a lot of oil, in order to live through high load conditions, when subjected to less than optimal thrust bearing pad-to thrust washer gaps, which occur under large tilt angle operation.

With ever increasingly tighter emissions regulations, the passage of oil from the bearing housing into either the turbine, or compressor housings becomes a more predominant issue. One of the best ways to prevent this oil passage is to flow less oil into the bearing housing so there is less oil available to travel through the seals. The design of today's thrust bearings runs contrary to this ideal.

For the automotive industry there is a need for a thrust bearing design which uses less oil flow than is used in current designs, which can be robust under all shaft tilt conditions, which can support a higher load, and a higher load duty cycle, under all conditions, and which is economical, capable of operating in the high speed, high temperature regimes found in turbochargers.

SUMMARY OF THE INVENTION

The present inventors took note that various points along the axis of the rotating shaft (101) describe different orbits (FIG. 5). The rotating assembly in the axial locations between the journal bearings describe very little radial displacement, and at one axial location—referred to as the tilt center (118)—the radial displacement is nearly zero, so that the shaft ends appear to "pendulum" from this tilt center. In the case of the conventional flat thrust bearing, this tilt of the rotor translates to a tilt condition between the thrust pads on the static component and the thrust faces on the dynamic component. Given the high rpm, and long life required, of turbochargers, over time this tilt condition increases wear and oil flow, both of which are undesired.

The inventors saw the possibility of designing a thrust bearing taking this phenomenon into account. Based on this insight the inventors designed thrust surfaces of both the thrust bearing and the thrust washers as a matched set in a spherical arrangement, with the radius of curvature being the distance from the thrust bearing centerline to the tilt center of the rotating assembly. This design accommodates any operational amount of tilt, and is thus immune from the problems associated therewith.

The turbocharger spherical (rotordynamic and tilt compensating) thrust bearing assembly according to the present invention is not liable to the problems associated with the conventional "flat" thrust bearings, and maintains a constant relationship between the thrust faces, even as the turbocharger shaft "wobbles", by use of the spherical thrust bearing geometry. This geometry, while more difficult to manufacture than that of a flat thrust bearing, provides a more constant relationship between the thrust pads and thrust washers than is possible with a typical flat thrust bearing. As a consequence of this more constant relationship the thrust bearing operates, with higher load capability, and with less oil flow, which ultimately may reduce vehicle emissions.

BRIEF DESCRIPTION OF THE DRAWINGS

The present invention is illustrated by way of examples and is not limitation in the accompanying drawings in which like reference numbers indicate similar parts, and in which:

FIG. 3A shows the orbits as the rotating assembly comes up to speed.

DETAILED DESCRIPTION OF THE INVENTION

As described above, conventional thrust bearing designs vary in their details but are flat. Given an understanding of the concept underlying the present invention, any conventional flat thrust bearing can be re-designed to the spherical design (spherical thrust interface) according to the present invention.

Figure 1:
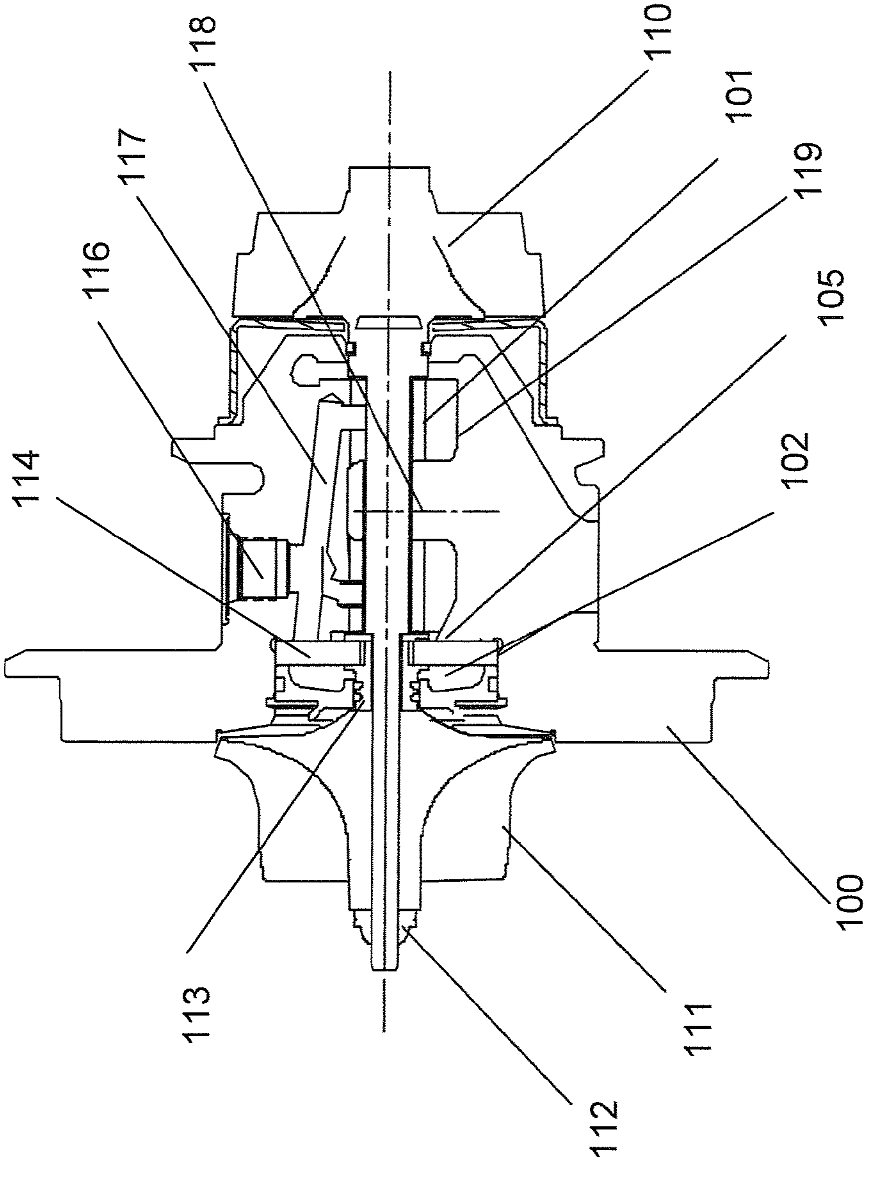
FIG. 1 depicts a typical turbocharger cross section.
Figure 2:
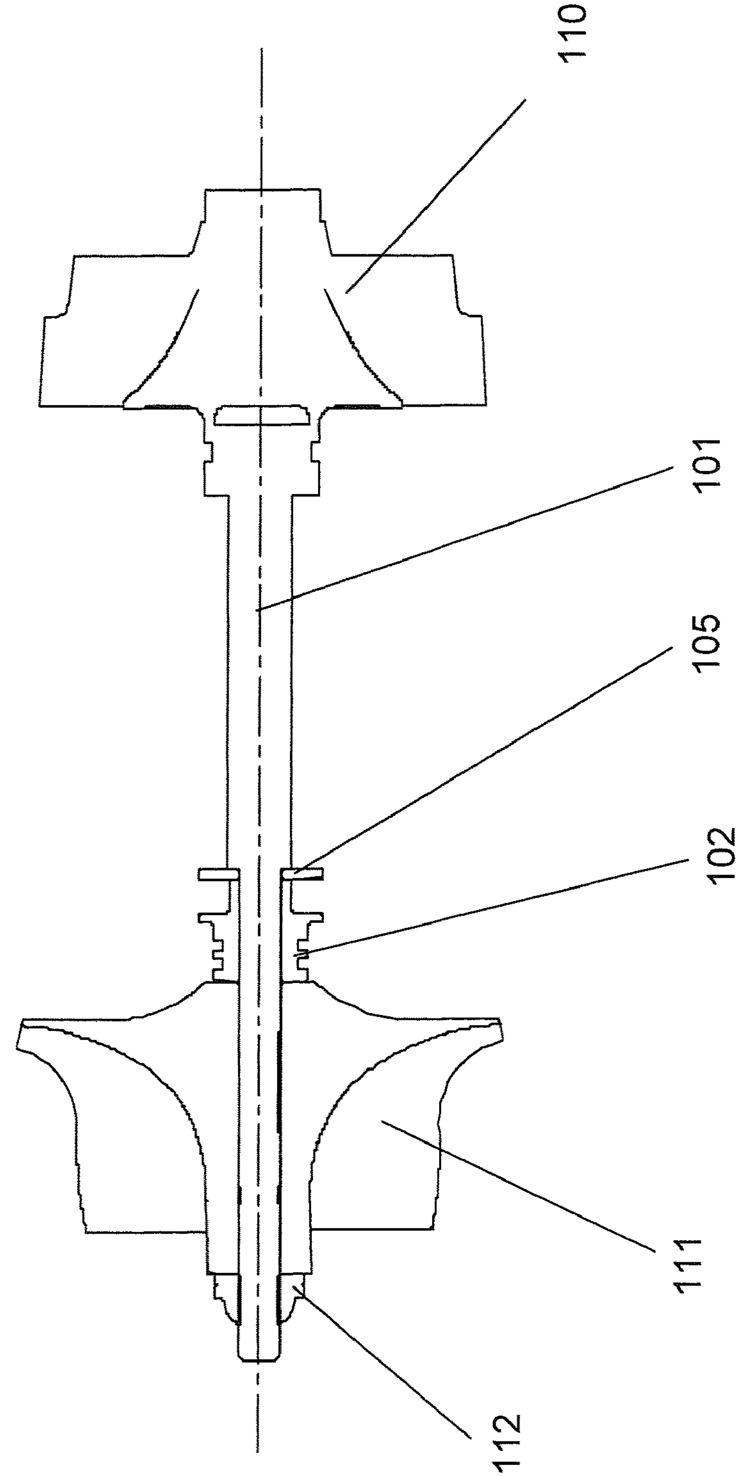
FIG. 2 depicts the parts of a rotating assembly cross section.
Figures 3A, 3B:
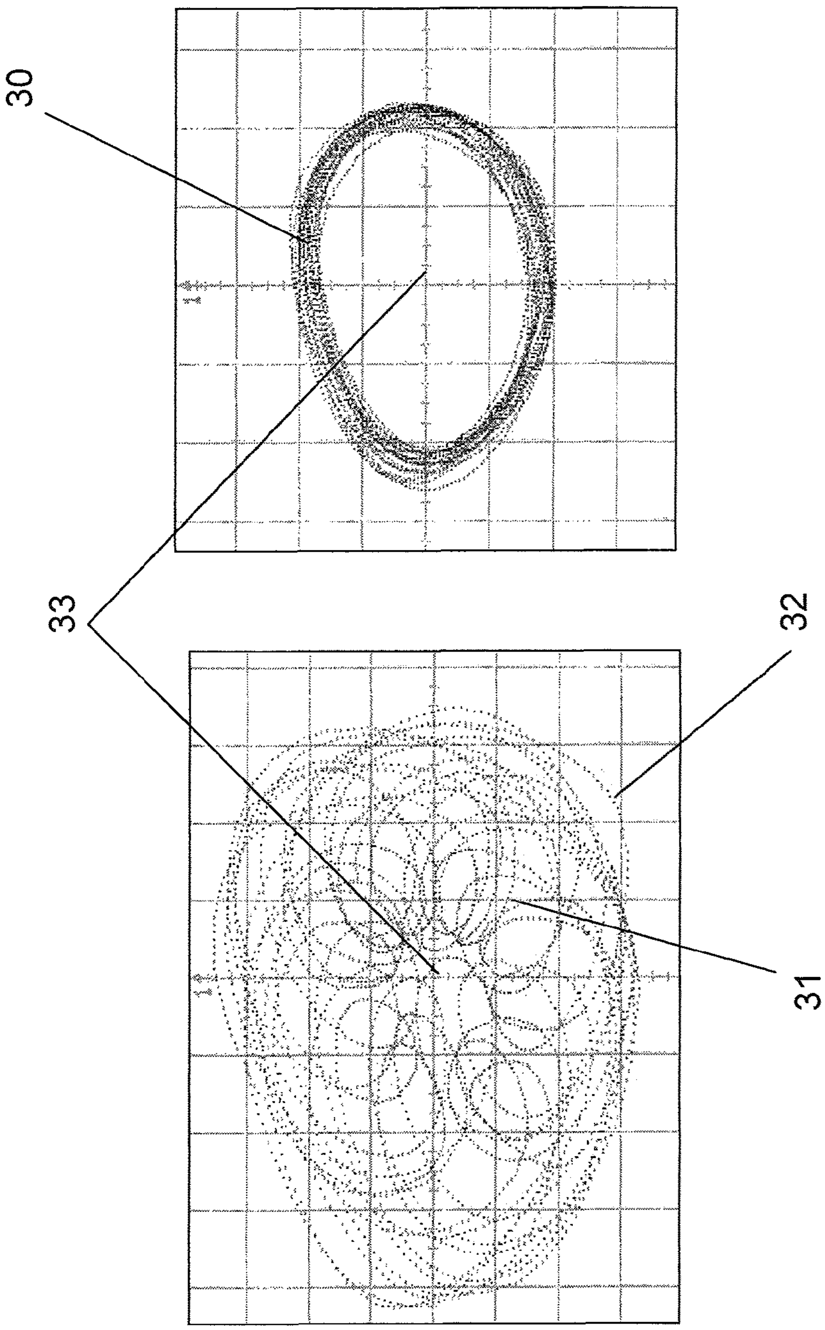
FIGS. 3A, B depict the orbits described by the compressor end of the shaft.
FIG. 3B shows the orbits while the shaft is at operating speed.
Figure 4:
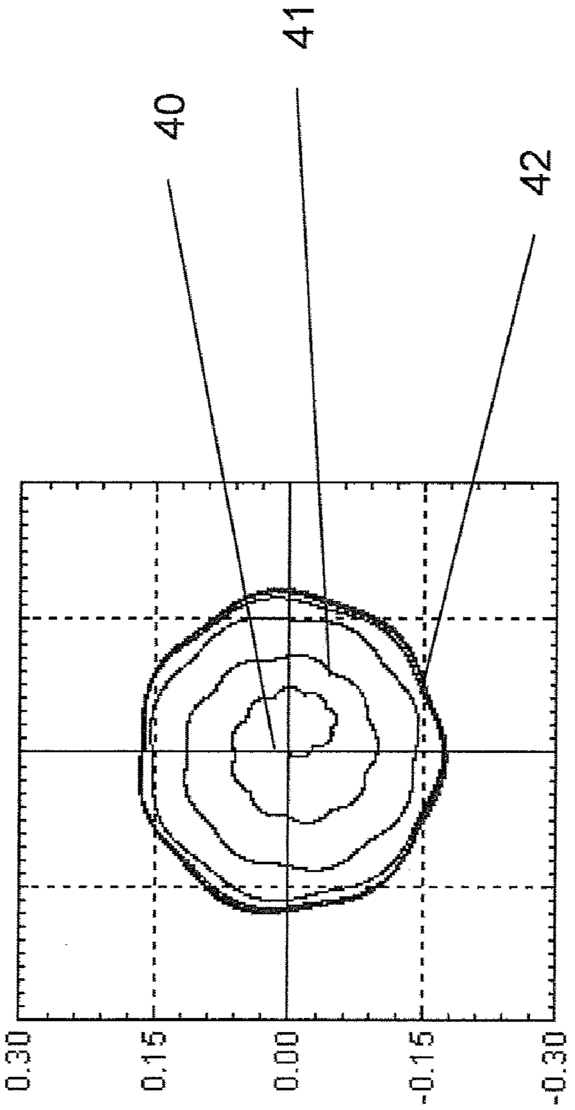
FIG. 4 depicts the orbits described by the turbine end of the shaft.
Figure 5:
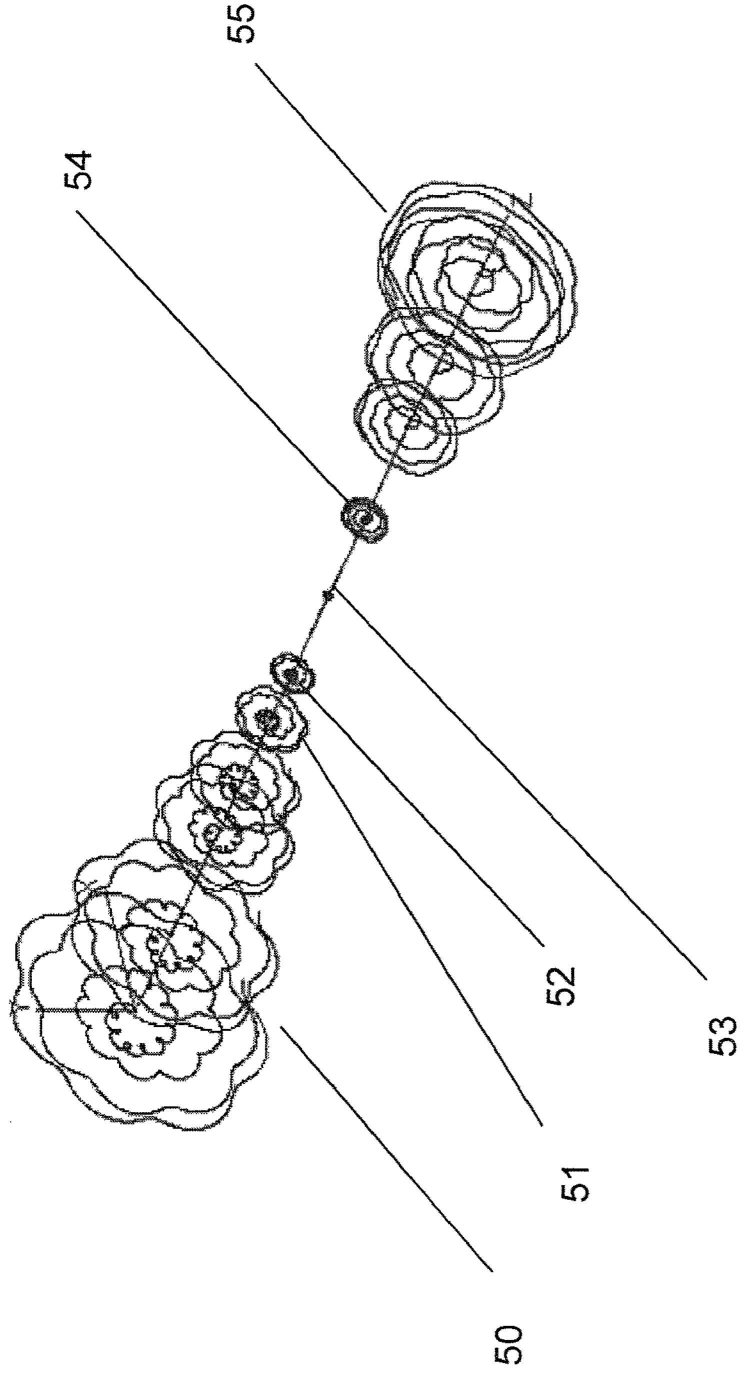
FIG. 5 depicts the orbits, at selected axial stations on the rotating assembly.
Figure 6:
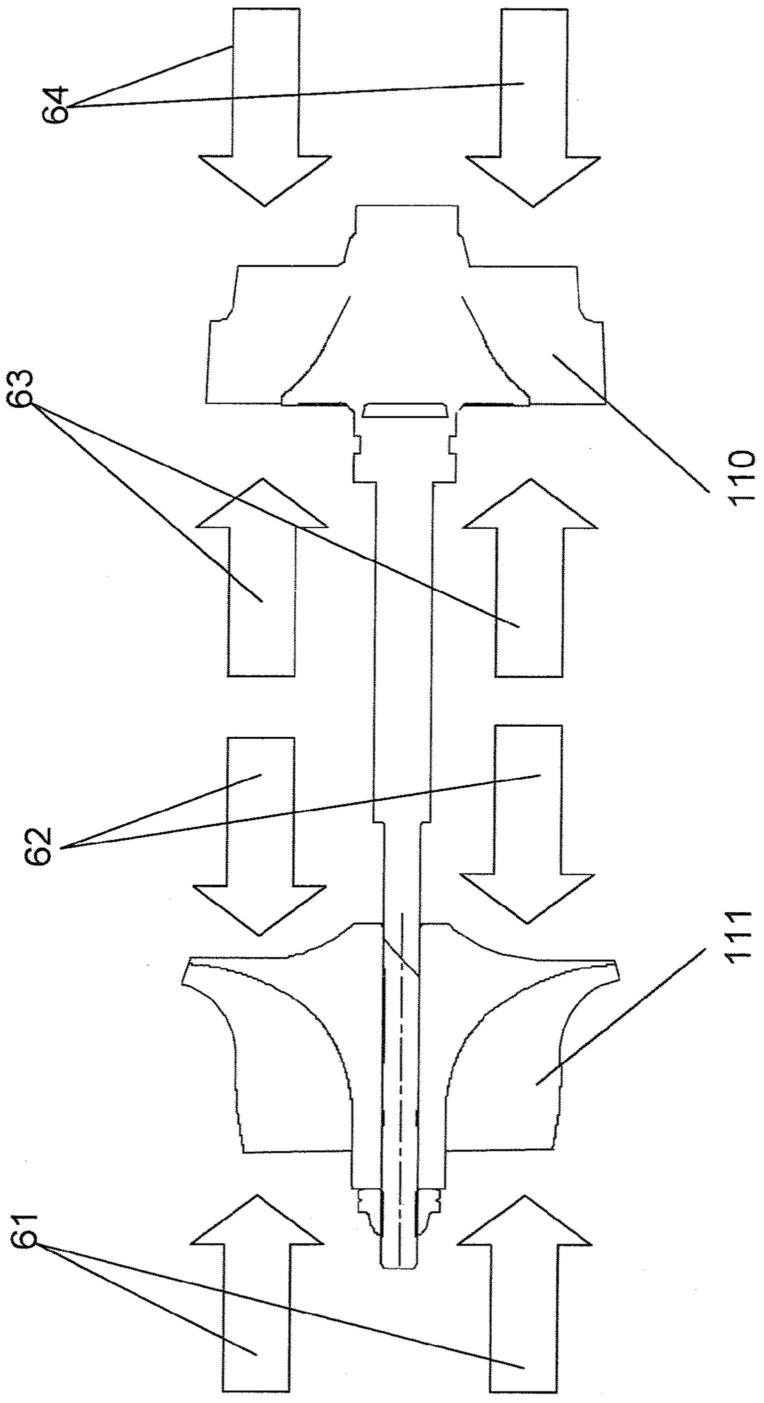
FIG. 6 depicts the pressures acting on the compressor and turbine wheels.
Figure 7:
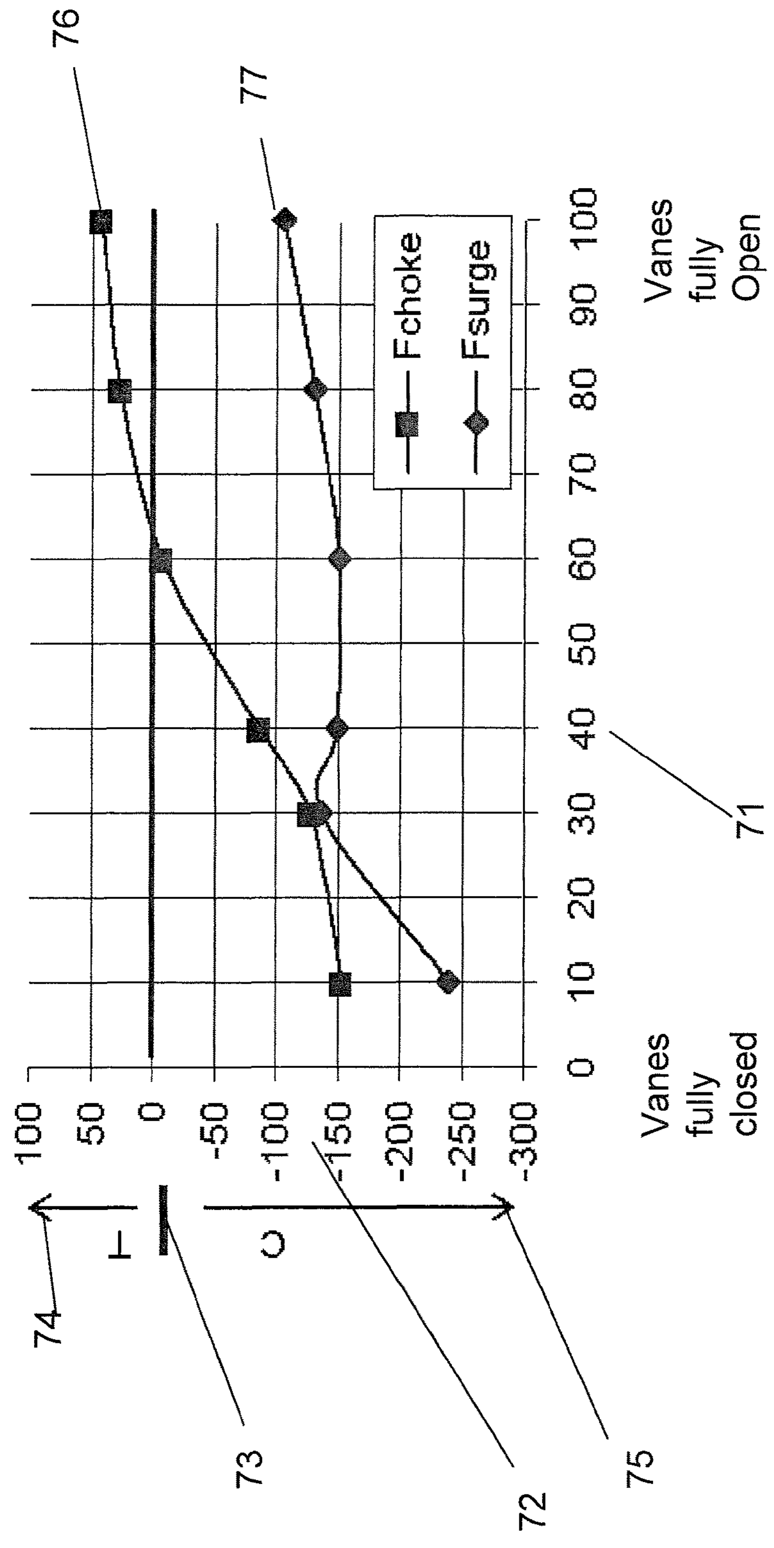
FIG. 7 depicts the thrust loads generated by a typical VTG turbocharger.
Figure 8:
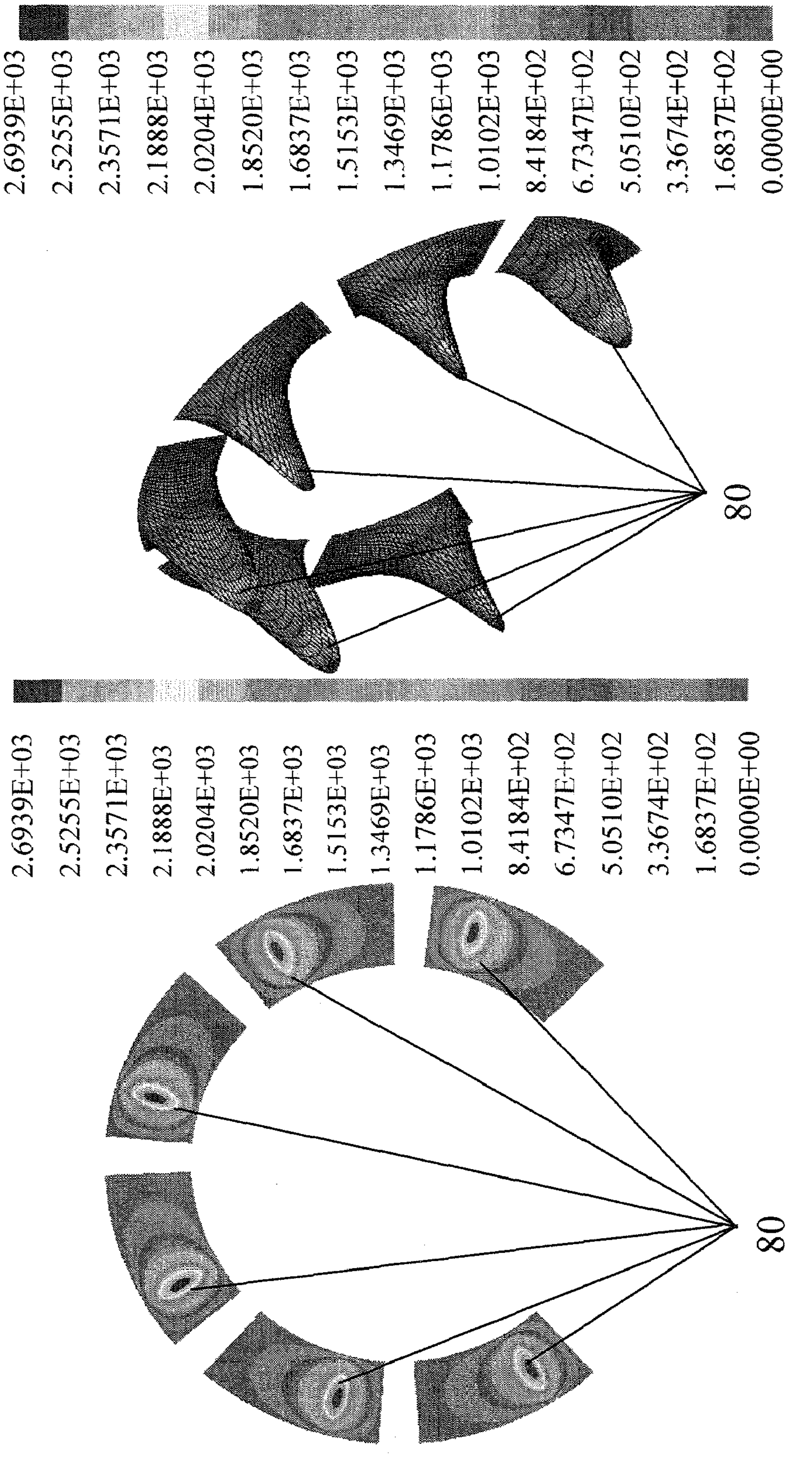
FIG. 8 is a simulation depicting the hydrodynamic oil film pressures exerted by a perfectly aligned thrust bearing.
Figure 9:
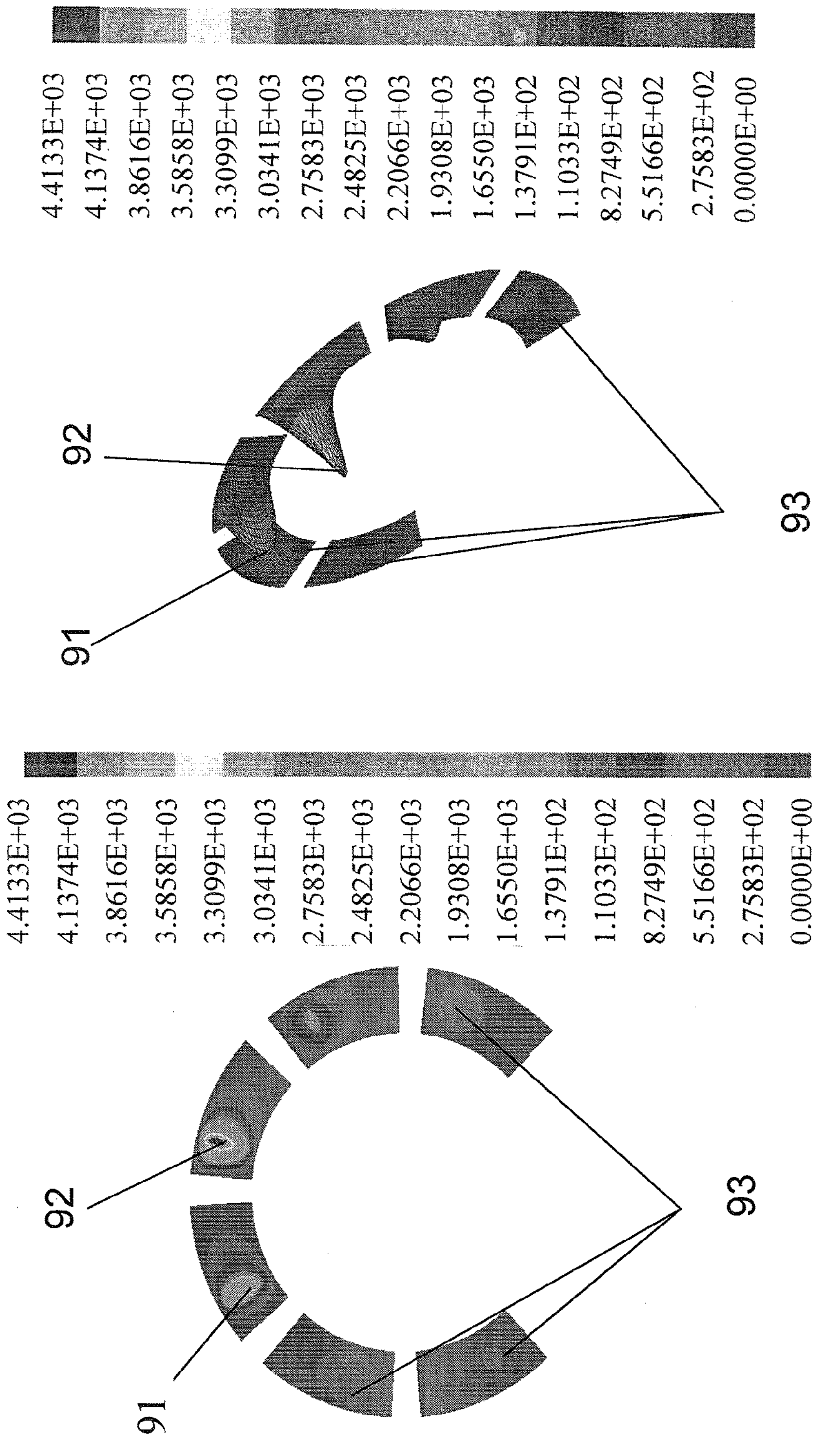
FIG. 9 is a simulation depicting the hydrodynamic oil film pressures exerted during a 25% max tilt condition.
Figure 10:
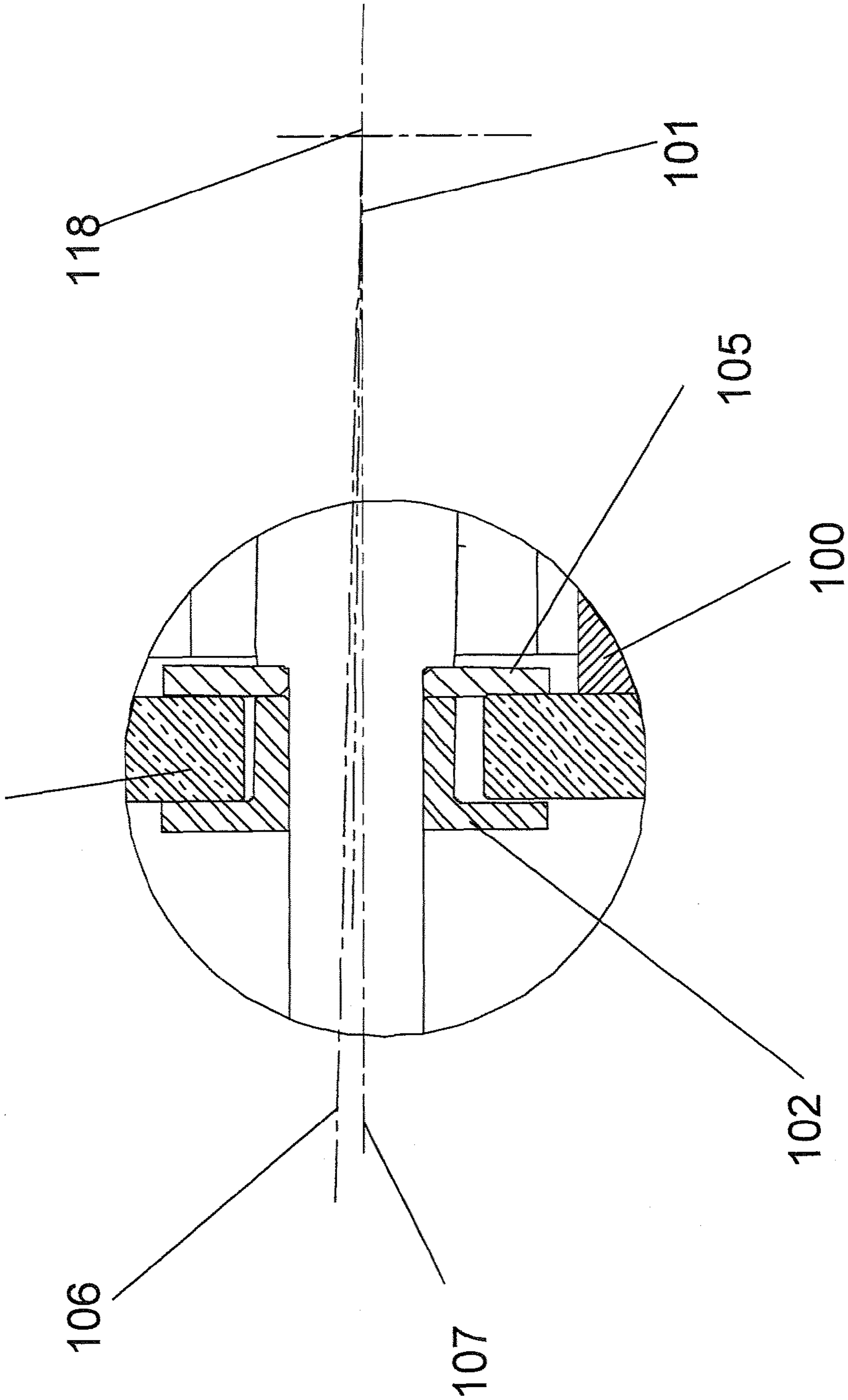
FIG. 10 is a section of a typical rotating assembly for a flat thrust system.

That is, various points along the axis of the rotating shaft (101) describe different orbits (FIG. 5), and more specifically, orbits of same shape but different diameter. The rotating assembly in the axial locations between the journal bearings exhibits very little radial displacement, and at one axial location—referred to as the tilt center (118)—the radial displacement is nearly zero. Considering that a pendulum free to swing in all directions will describe a sphere, the inventors saw the possibility of designing a thrust bearing incorporating this geometry. Thus, the thrust surfaces of both the thrust bearing and the thrust washers are a matched set in a spherical arrangement, the radius of curvature being the distance from the thrust bearing centerline or thrust faces to the tilt center of the rotating assembly.

The tilt center is a point or location on the shaft centerline about which the shaft tilts. This location, or point, is determined by geometric analysis of the rotating assembly, constrained by tolerances and clearances of items such as the shaft, bearings, bearing housing bores, compressor and turbine wheel clearances from their respective housing contours and axial spacing of the journal bearings. This analysis is also modified by the dynamic shaft bending analyses and empirical data taken in the test lab. The tilt angle (106, 107) is a result of this analysis. For the subject test turbo this angle was 0.24°.

Figure 11:
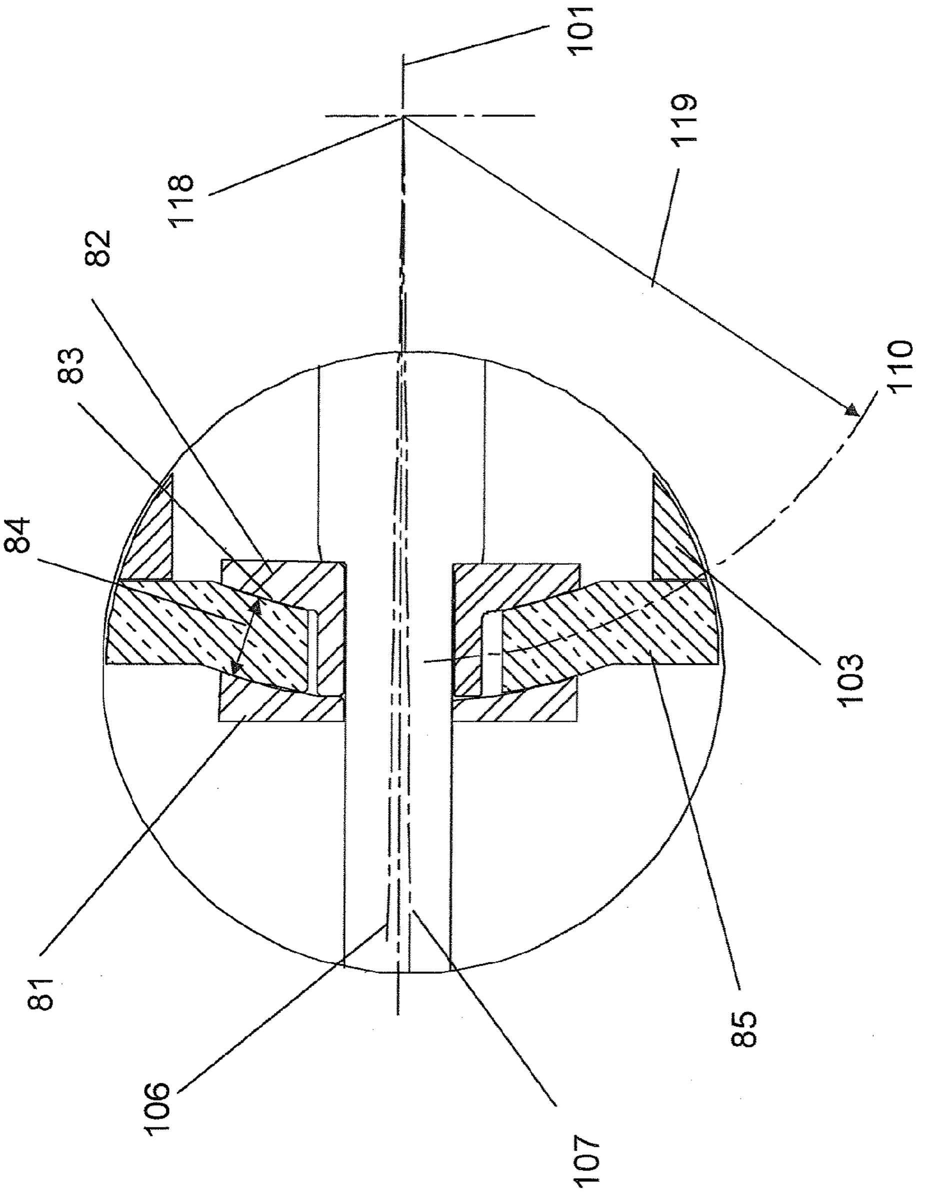
FIG. 11 is a section of a rotating assembly with a spherical thrust system.

The spherical thrust bearing configuration is designed such that the thrust bearing (85) has a central section, as depicted in FIG. 11, the centerline (110) of which is described as a radius (119) equal to the distance from said thrust bearing centerline to the tilt center (118). The thrust faces on the thrust bearing (84), lie on radii from the tilt center to the thrust bearing surface (84). The inside faces (83) of the thrust washers (81, 82) are also located on radii from the tilt center to the inner face of each thrust washer (81, 82). Oil is fed to the thrust bearing ramp areas in the same manner as that of a flat thrust bearing design. The spherical thrust bearing (85) is located in the bearing housing (100) on the thrust face (103). The relationship between the thrust pads on the static component, and the thrust face on the dynamic component, is more constant than in the case of the flat bearing where the tilt of the rotor translates to a tilt condition between the static component and the dynamic component. The nexus of this invention is the spherical segment design, which keeps the relationship between thrust bearing ramp and pad, and thrust washer face, as close to constant as possible.

Figure 14:
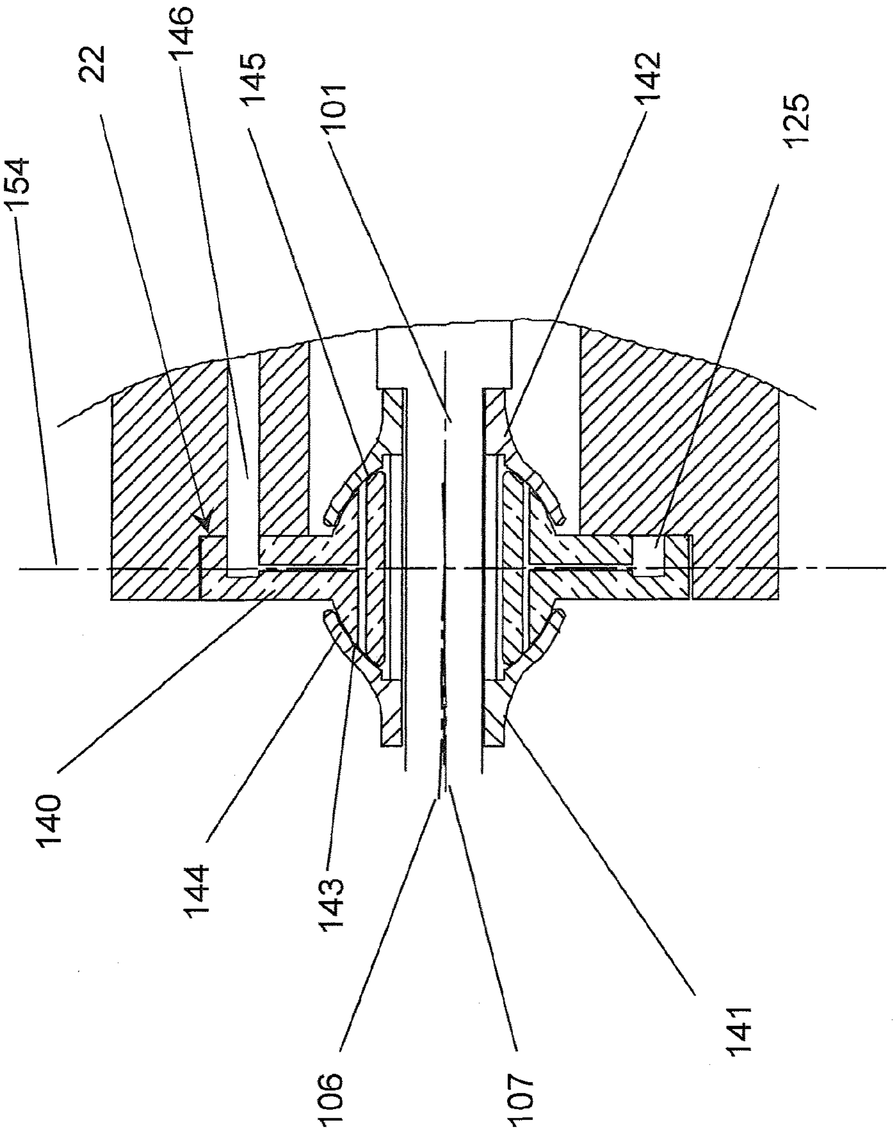
FIG. 14 is a section of an alternative embodiment of the spherical bearing, with symmetric thrust sections.

A second embodiment of this design has the tilt center between thrust faces; the thrust faces opposing each other, as against operating with the locus (tilt center) on the outside. In this design, FIG. 14, the male, static component, the thrust bearing (140) has oppositely facing, convex, spherical segment, faces (144), on opposite sides of the bearing zone, about the thrust bearing centerline (154), and the female, dynamic, components (141, 142) have oppositely facing, concave, spherical segment, faces (143, 145), which mate with the faces on the bearing (144). The cooperating female thrust washers (141) and (142) may, or may not, be identical, due to geometric, or assembly conditions external to the bearing function. It would be advantageous, from a part count and assembly perspective, that they are a single common part. The spherical thrust bearing (140) of the second embodiment of the invention, locates to the bearing housing (100) on a face (22) fabricated into the bearing housing. Oil is supplied to the thrust bearing oil canal (125) through an oil gallery (146), in the bearing housing (100).

This embodiment of the spherical segment thrust bearing design is designed such that the centerline (154) of the thrust bearing and the tilt center (118) of the turbocharger are coincident. Since the axial location of the tilt center (118) is reliant, among other features, on the position, design, and tolerancing of the journal bearings, and their associated mounting features, the bearing centerline (154), by design, must be axially placed with those features. The radius of curvature of the spherical segments could be freely selected so long as the tilt center is located at the core. The radius of curvature is determined by the distance from the tilt center (fixed from the geometry) to the axial point at which the designer chooses to place the thrust bearing in the bearing housing. The thrust capacity of the thrust bearing is handled by the area of the pad (and ramp) and the ramp depth, along with details of the oil supply. Pads with a large area, can support large thrust forces, pads with small areas can support small loads. If one has a pad with small area and a large force is present, the placing of an oil dam at the foot of the ramp supplies a lot of oil, which raises the load carrying capacity to a point. Oil is fed to the thrust ramps through the oil galley (146) in the bearing housing and thence through the oil canal (125) in the thrust bearing in a manner similar to that of a typical thrust bearing. Details of this design may be freely varied.

Figure 15:
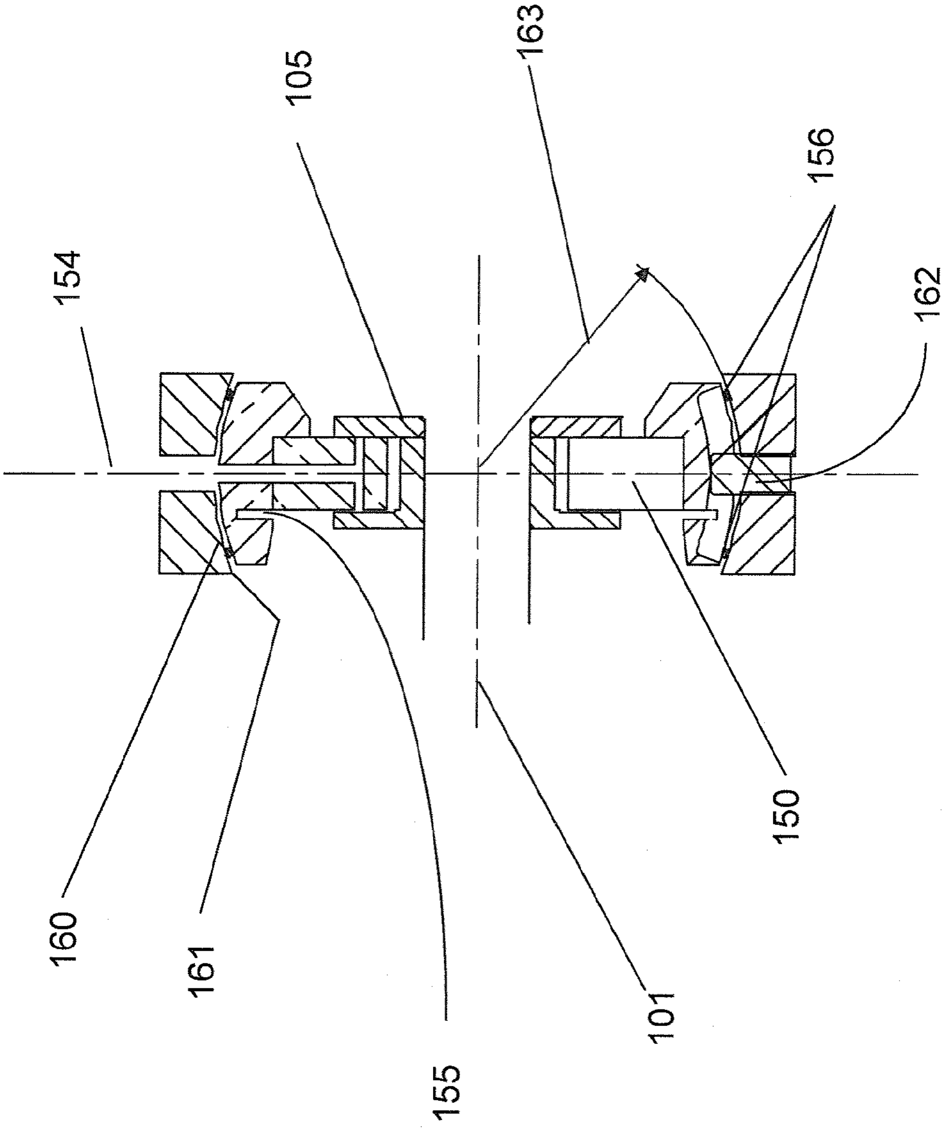
FIG. 15 is a section of an alternative embodiment of the spherical bearing, with the thrust assembly able to rock to accommodate tilt.
Figure 16:
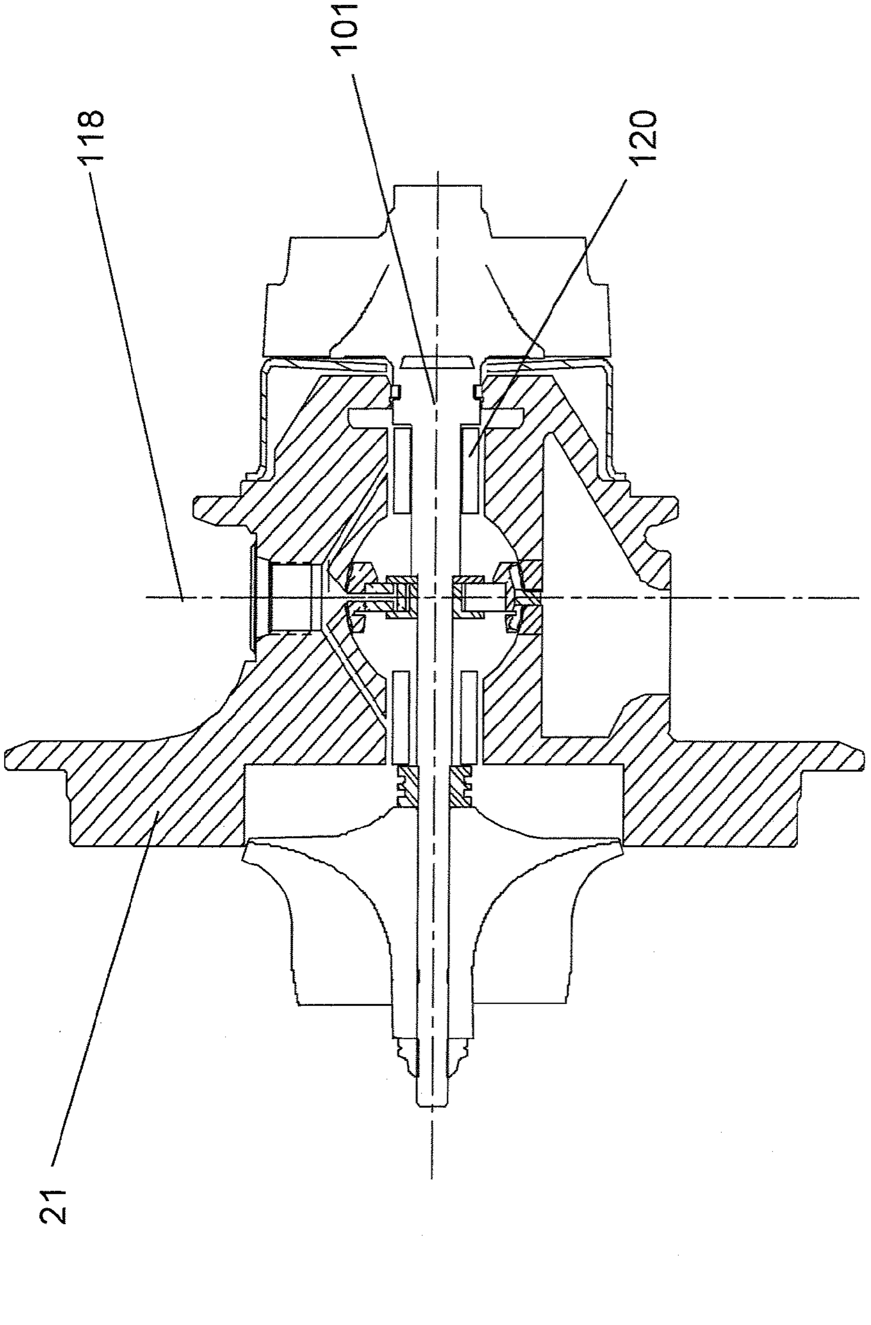
FIG. 16 is the embodiment of FIG. 15, in a center housing.

In another embodiment, the thrust bearing (150) FIG. 15 is reduced in diameter, and the thrust bearing is supported and captured in a holder (155). The holder has a spherical segment surface (161), which mates with another spherical surface (160) located on the inner surface of the mount (158). The radius of curvature of the spherical surface (161) is depicted as (163) in FIG. 15. Oil is fed to both the spherical interfaces (160 and 161), and to the thrust bearing, through an oil gallery (159). There are seals (156) which mount on the holder (155) and seal against the female spherical surface (180) to maintain oil pressure, for lubrication and damping, on this interface and keep the oil lost from the immediate thrust bearing system to a minimum. The holder (155), containing the thrust bearing element (150) is free to move in all directions, but rotation. This means that any tilt encountered in the orbiting of the rotating assembly is repeated in the thrust bearing, thus maintaining the relationship between the plane of the thrust pads and the surface of thrust washers. The execution of this design ensures maximum load carrying capacity of the thrust bearing, for a minimum of oil flow. The anti-rotation pin (162) and slot prevent the thrust bearing from rotating with the rotating assembly. The centerline (154) of this design is coincident with the tilt center (118) of the bearing system. FIG. 16 shows this embodiment located within the bearing housing assembly. Since the axial location of the tilt center (118) is reliant, among other features, on the position, design, and tolerancing of the journal bearings, and their associated mounting features, the bearing centerline (154), by design, must be axially placed with those features.

Figure 17:
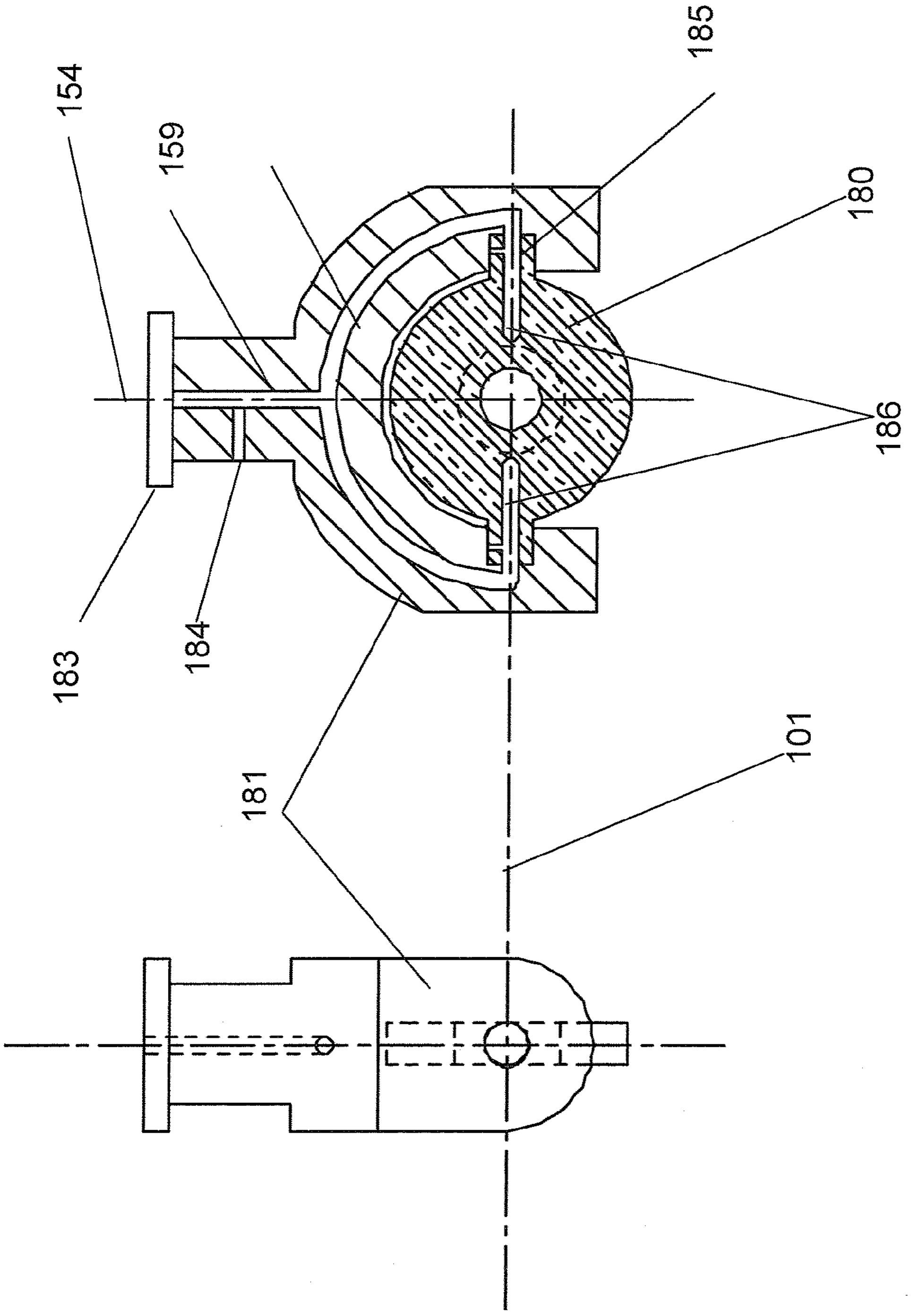
FIG. 17 is another embodiment of a thrust bearing mounted in a set of gimbals, in a center housing.
Figure 18:
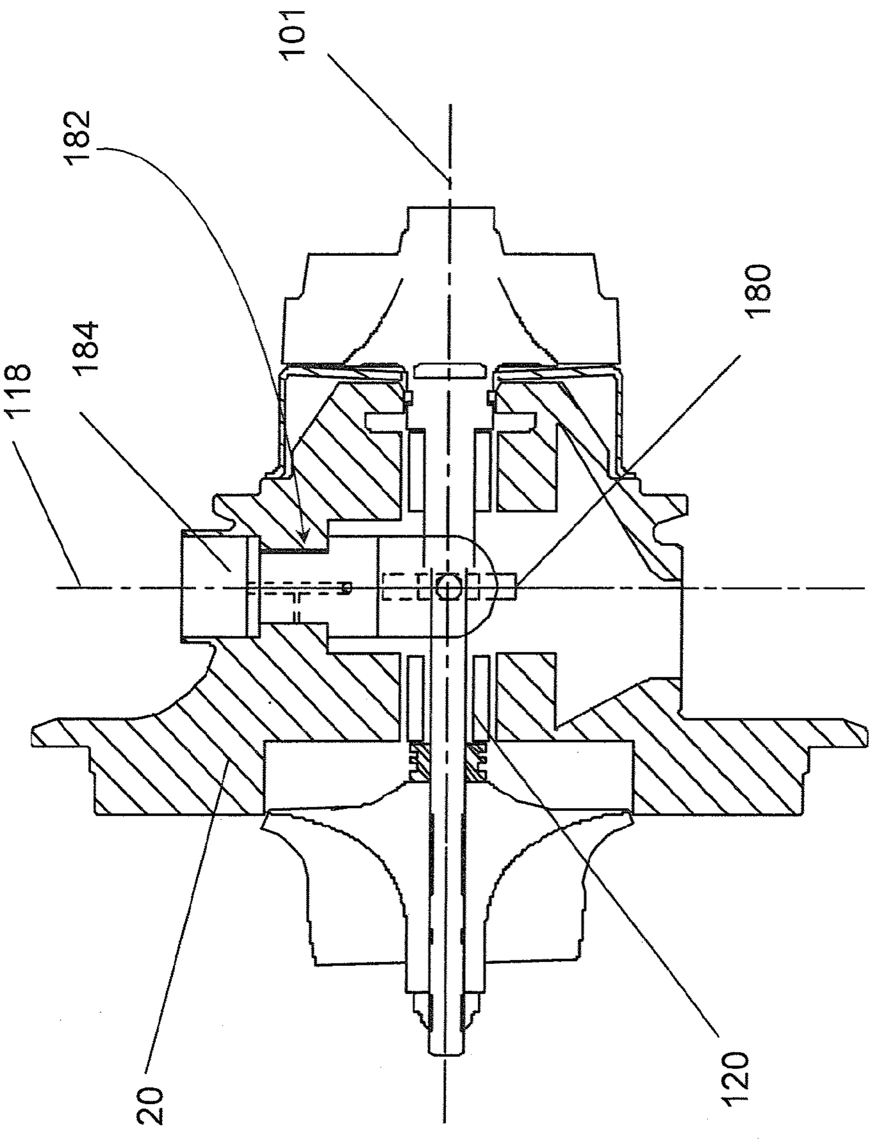
FIG. 18 the embodiment of FIG. 17 magnified for detail.

In another embodiment of the basic invention, the thrust bearing is reduced in size, and captured in a holder as in the above embodiment. In FIGS. 17 and 18, this assembly in mounted in the bearing housing (20) in a set of gimbals fashion to the 1st motion component (181) of the gimbals assembly. This $1^{st}$ motion component is free to rotate in a plane perpendicular to the centerline axis (154). The $2^{nd}$ motion component (180) is mounted into the $1^{st}$ motion component (181). The $2^{nd}$ motion component is free to rotate about an axis (101), which is perpendicular to the axis (154) of the $1^{st}$ motion component (181). The $1^{st}$ motion component (181) rotates on a bore (182) in the bearing housing (20). The $2^{nd}$ motion component rotates on a bearing (185) which locates in the $1^{st}$ motion component (181). Oil for the thrust bearing operation is supplied from the turbocharger oil inlet (184) through an oil gallery (159) in the $1^{st}$ motion component (181) and then through oil galleries (186) in the $2^{nd}$ motion component (180) to the thrust pads. Oil for lubrication of the $1^{st}$ motion component (181) for the rotation in the bearing housing (20) is supplied through an oil gallery (184) linking the oil gallery (159) fluidly connecting the oil inlet (184) to the oil gallery (185) of the $2^{nd}$ motion component (180).

The $1^{st}$ motion component (181) is retained in the bearing housing by a retaining ring (183) which mounts to the $1^{st}$ motion component sandwiching the bearing housing (20).

Figure 12:
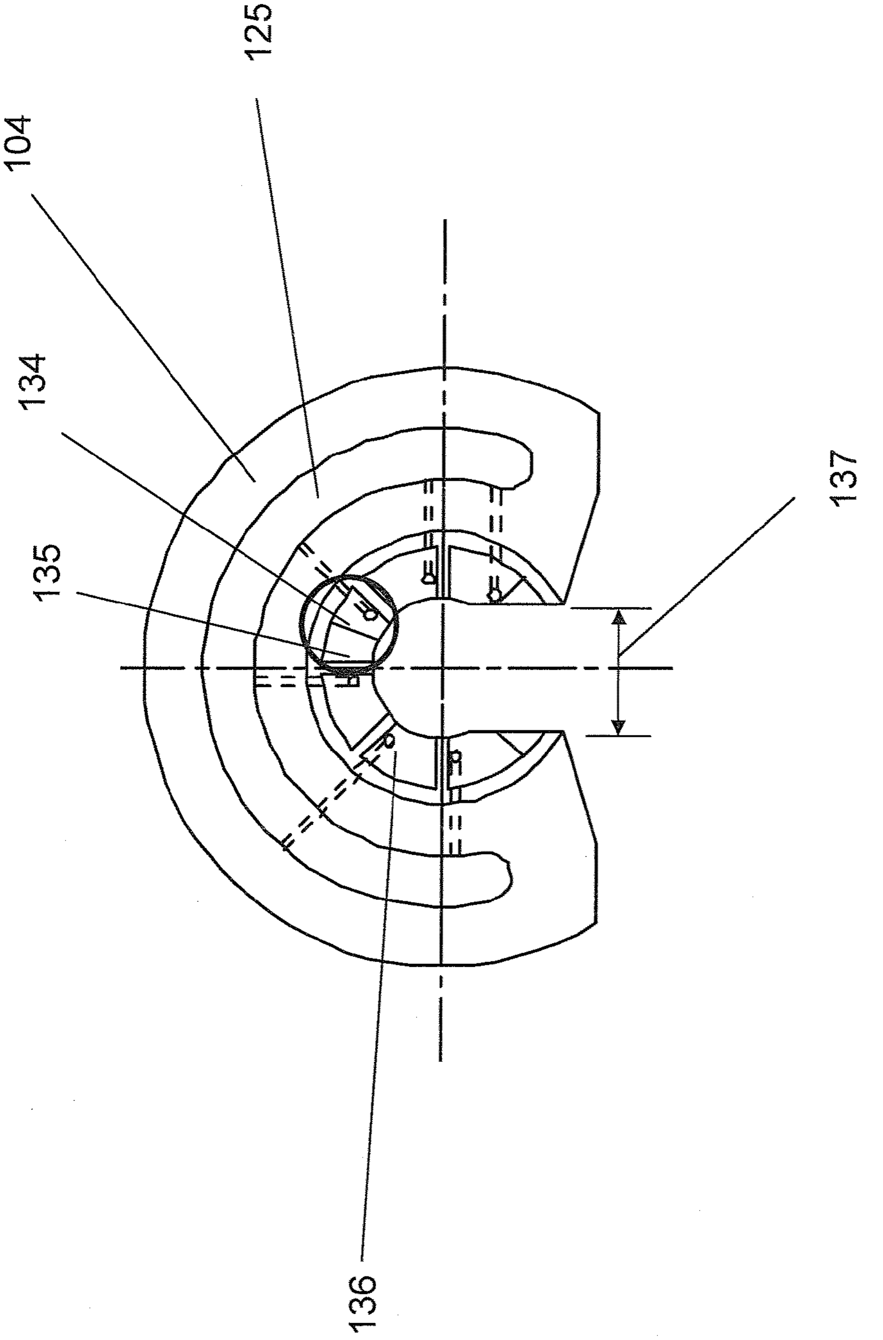
FIG. 12 is a typical thrust bearing.
Figure 13:
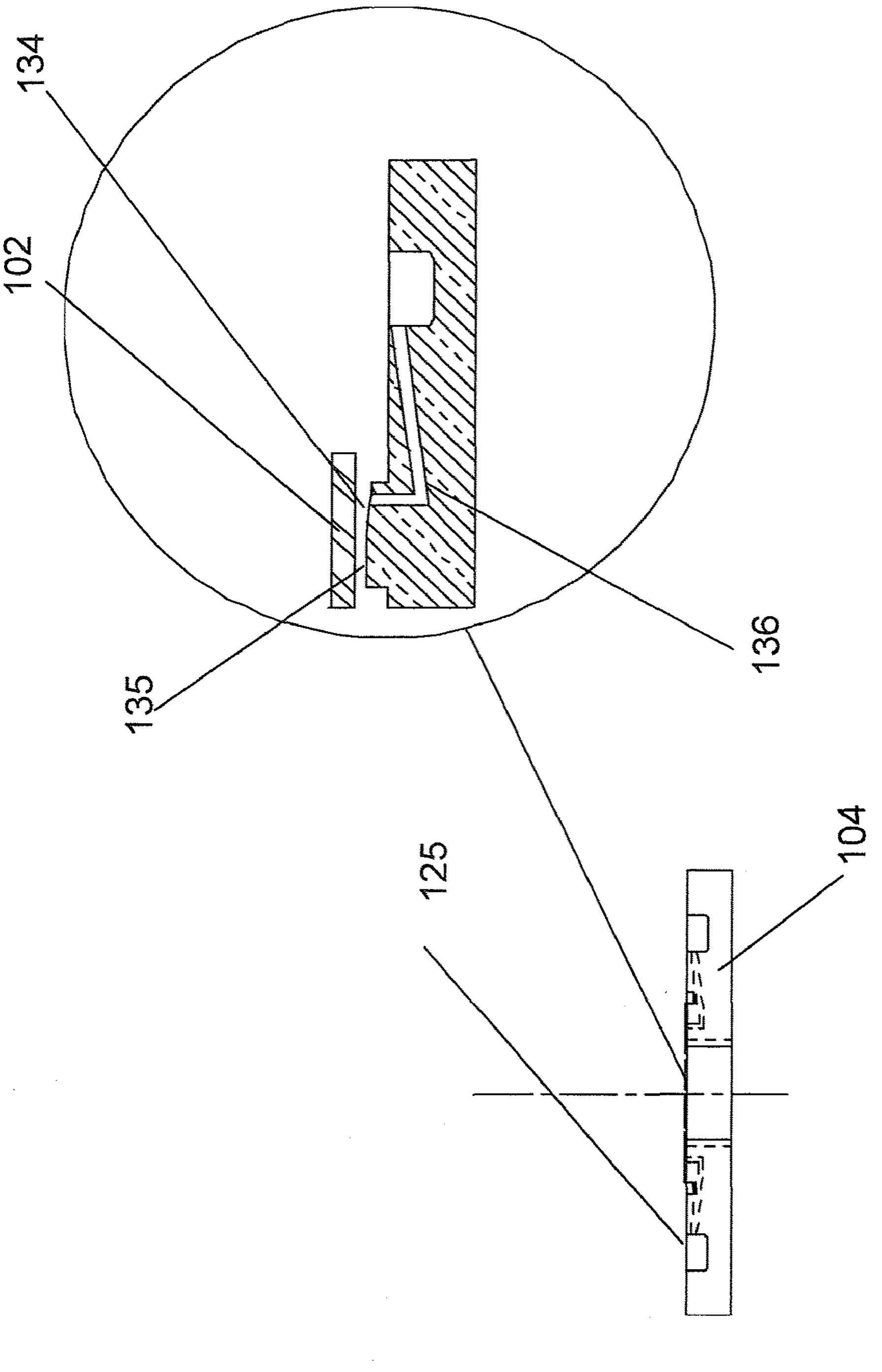
FIG. 13 is a magnification of a thrust pad and washer from FIG. 12.

In either embodiment of the invention the thrust bearing can be either a full curved disc with a bore in the center, or a horseshoe design as in FIG. 12, but with the curved feature. As in the flat design of the thrust bearing neither the number of pads, nor the load carrying capacity in the spherical thrust bearing is limiting. The $2^{nd}$ motion part (180) could be a holder, containing the thrust bearing, as in FIG. 16, or it could be one part.

We claim:

1. A turbocharger rotating assembly comprising:
a compressor wheel (111),
a turbine wheel (110),
a shaft (101) connecting the turbine wheel to the compressor wheel,
at least one journal bearing (52) for radially locating the shaft, and
at least one thrust bearing for axially locating the shaft,
wherein said thrust bearing defines a pivot point along said shaft allowing the shaft ends to describe reciprocal orbits.

2. A turbocharger rotating assembly as in claim 1, wherein said thrust bearing comprises at least one static component (85) and at least one dynamic component (82), wherein the static component and dynamic component cooperate to form a spherical thrust interface (83).

3. A turbocharger rotating assembly as in claim 1, wherein said thrust bearing is a gimbal mount.

4. A turbocharger rotating assembly comprising:
a compressor wheel (111),
a turbine wheel (110),
a shaft (101) connecting the turbine wheel to the compressor wheel,
at least one journal bearing (52) for radially locating the shaft, and
at least one thrust bearing for axially locating the shaft,
wherein the thrust bearing comprises at least one static component (85) having a first static face and a dynamic component (82) having a first dynamic face,
wherein the first static face and first dynamic face cooperate to form a spherical thrust interface (83).

5. The turbocharger rotating assembly as in claim 4, wherein the shaft rotates about a tilt center (53) near the geometric center of the shaft, and wherein the radius of the curvature defined by the spherical thrust interface corresponds to the distance from the tilt center (53) to the spherical thrust interface (83).

6. A turbocharger rotating assembly as in claim 5, wherein the static component has a second static face (109), wherein the dynamic component has a second static face, and wherein the second static face and second dynamic face form a thrust interface (83) with a curvature defined by a radius corresponding to the distance from the tilt center (53) to the second static face (109).

7. A turbocharger rotating assembly as in claim 6, wherein the tilt center is located at a point along the shaft between said first and second static faces.

8. A turbocharger rotating assembly as in claim 6, wherein the tilt center is located at a point along the shaft not between said first and second static faces.

9. A turbocharger as in claim 4, wherein said static component includes a plurality of discrete bearing pads, each having a bearing face across which a borne surface moves while supporting said dynamic face, and a substantially rigid carrier for said bearing pads.

* * * * *